United States Patent
Gertler, Jr.

[11] 3,893,709
[45] July 8, 1975

[54] VEHICLE TOWING CABLE APPARATUS

[76] Inventor: Bernard H. Gertler, Jr., 1696 Samar Dr., Costa Mesa, Calif. 92626

[22] Filed: Feb. 11, 1974

[21] Appl. No.: 441,013

[52] U.S. Cl............ 280/292; 242/86.5 R; 242/106; 254/150 R; 254/166; 280/480
[51] Int. Cl.² .......................................... B60D 1/18
[58] Field of Search .... 280/292, 480, 491 F, 478 R; 242/86.5 R, 106, 95; 254/166; 180/7 R

[56] References Cited
UNITED STATES PATENTS

| | | | |
|---|---|---|---|
| 570,817 | 11/1896 | Pruitt | 242/95 X |
| 675,453 | 6/1901 | Sturgess | 280/292 |
| 1,566,740 | 12/1925 | Forrest | 280/480 |
| 1,576,967 | 3/1926 | Gould | 280/491 R X |
| 1,591,686 | 7/1926 | Silva | 280/491 F X |
| 3,362,727 | 1/1968 | Malherbe | 280/446 B |

FOREIGN PATENTS OR APPLICATIONS 13,115  1/1906  United Kingdom............... 280/292

Primary Examiner—Leo Friaglia

[57] ABSTRACT

A towing device for extricating a motorcycle mountable on the front fork of the cycle and includes a helically fluted spool for receiving or feeding out a cable having a hook at its free end for attachment to a towing vehicle.

12 Claims, 8 Drawing Figures

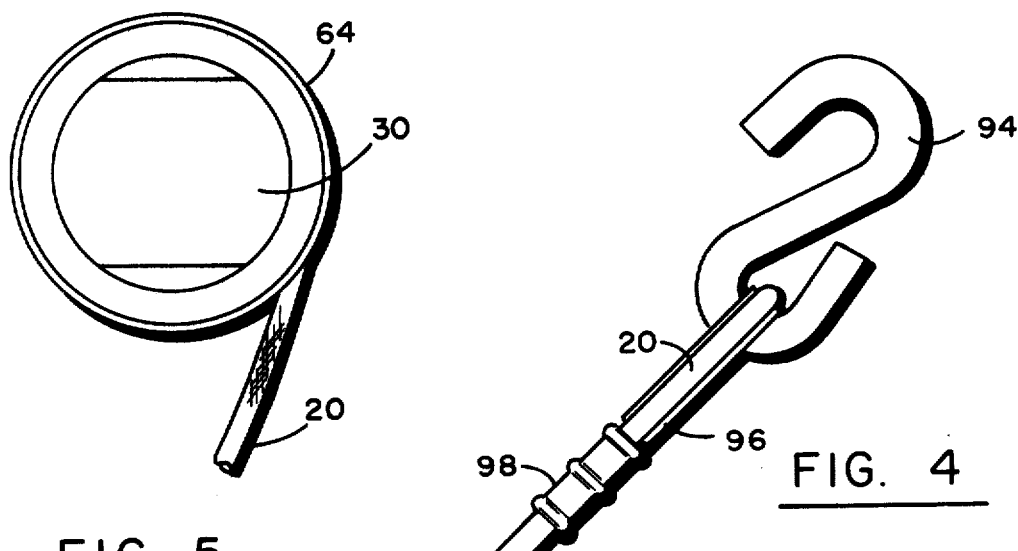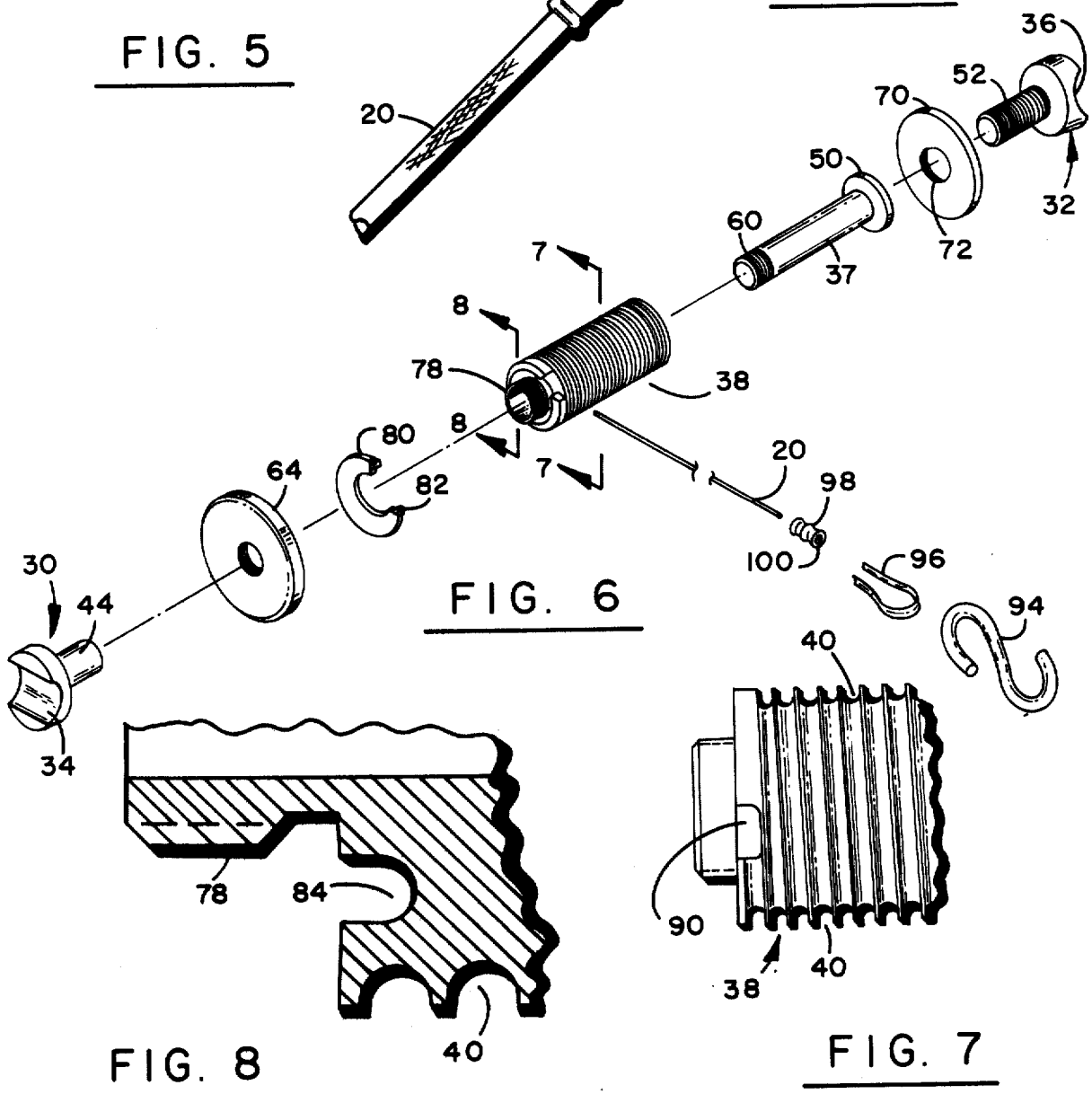

VEHICLE TOWING CABLE APPARATUS

BACKGROUND OF THE INVENTION

1. Field of the Invention

The field of this invention lies within the motorcycle and vehicle towing art. More specifically, the field relates to an emergency towing device for a motorcycle or other vehicle for moving the motorcycle from a given area by means of separate motive power.

2. The Prior Art

Motorcycles and other wheeled vehicles in the past have often been inoperative due to mechanical failures or the inability fo extricate the vehicle from a place because of a lack of traction. As a consequence, ropes, cables, hoisting means and other methods have often been used to withdraw such vehicles.

Recently it has become popular for motorcycles and other wheeled vehicles to be operated in unpopulated areas. Oftentimes these unpopulated areas have substantially difficult terrain to ride over. It is in these instances that the vehicles sometimes become stuck. For instance, it has been popular for motorcycle riders to ride in sand dune areas, up and down hills and through wooded country. In addition thereto, motorcycles often fail in urban areas on streets during normal traffic conditions.

As a consequence of the foregoing, it is oftentimes necessary to extricate the motorcycles, or tow them by some suitable means. In towing them, cables and other pulling devices are oftentimes used. As is so often the case, the towing vehicle and the vehicle to be towed, such as a motorcycle, do not have a cable. This particular invention provides a motorcycle with an easily implaced towing cable. The towing cable is always ready for service or to be utilized for towing another vehicle. For instance, the invention hereof can be reversed and run backwardly in order to tow another vehicle. However, in most cases, it is thought that it will be used for towing purposes wherein the vehicle upon which the invention is mounted is towed by a second form of motive power.

The instant invention hereof is such that it provides a motorcycle towing cable which can be stored on a fluted spool. The fluted spool is mounted between the fork members of the motorcycle and can be removed or implaced at will.

The spool can be checked from rotation. Thus, after retraction and extension of the cable it can be wrapped on the fluted spool and held or extended to a certain length and checked from further extension.

The fluted spool can also be locked or checked after it has been turned for extension or retraction of the cable to any particular point in its rotation. Additionally, a means for locking the cable into the spool is provided by a collar and securement arrangement. In this manner, the tighter the securement arrangement is implaced against the cable, the more effective the locking force is.

SUMMARY OF THE INVENTION

In summation, this invention comprises apparatus for a retractable motorcycle towing cable having a hook on the end thereof. The towing cable is retracted and extended from a helically fluted spool which is held between the two tubular members of the motorcycle fork.

The helically fluted spool retracts and stores the cable between the convex portion of the flutes, so as to uniformly wrap the cable therearound. The spool is held on an axle or spindle which expands outwardly against the tubular members of the fork in order to frictionally engage the spindle thereagainst by expension. Thus, the capability is provided to implace the spindle or axle with the entire motorcycle towing apparatus between the fork by threadedly expanding the spindle or axle in the foregoing manner.

When the spool is rotated, it allows for extraction and retraction of the cable. In the fully retracted mode for storage, the spool is retained from rotation by clamping collars. Specifically, a pair of clamping collars on either side of the spool enable the spool to be locked from rotation either in the mode wherein the cable has been extended or when the cable is fully retracted and stored thereon. The hook of the cable during storage can be secured to any particular portion of the motorcycle or allowed to fall freely depending upon the desires of the user.

BRIEF DESCRIPTION OF THE DRAWINGS

FIG. 4 shows the terminal end of the cable where it is hooked to a vehicle providing motive power as encircled by line 4 of FIG. 1;

FIG. 5 shows an end view of this invention along lines 5—5 of FIG. 2;

FIG. 6 shows an exploded view of this invention;

FIG. 7 shows a fragmented detailed view of the spindle of this invention in the direction of lines 7—7 of FIG. 6; and, FIG. 8 shows a partially fragmented view through the section of lines 8—8 of FIG. 6.

DESCRIPTION OF THE PREFERRED EMBODIMENTS

Figure 1:
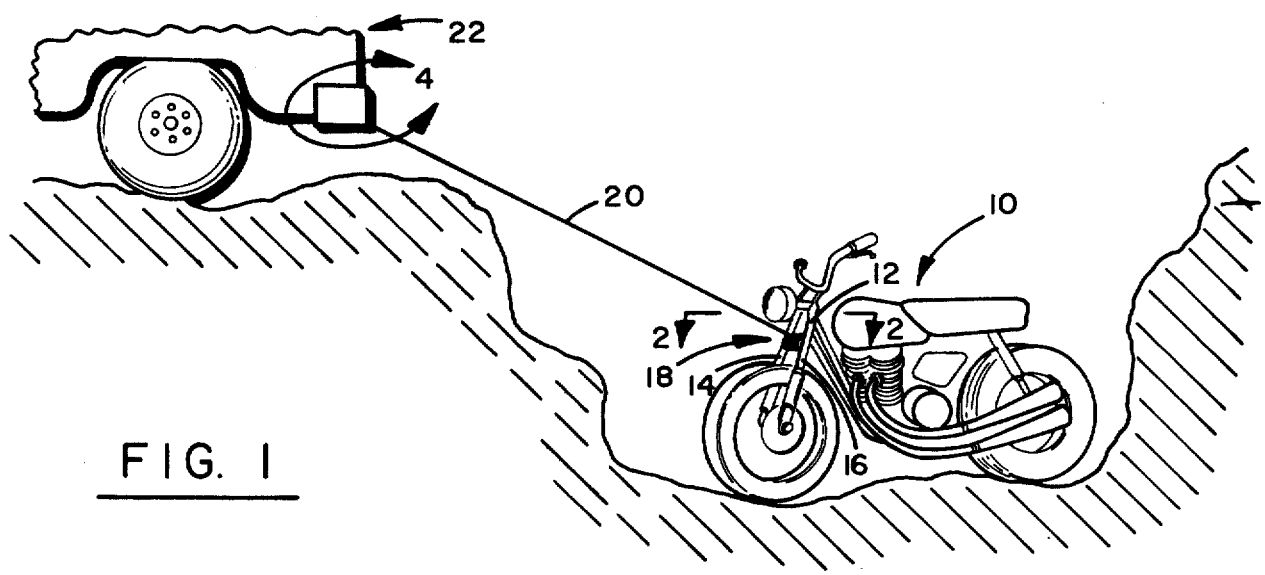
FIG. 1 shows a perspective view of a motorcycle being towed by this invention.

Looking more particularly at FIG. 1, a showing is made of a motorcycle 10 having the general conformation thereof with wheels and a motor. The motorcycle 10 has a fork 12 with a pair of tubular members 14 and 16. The tubular members support the towing apparatus of this invention, generally designated 18. The towing apparatus is shown with a cable 20 extracted therefrom and linked to a vehicle bumper 22.

As can be appreciated, the utilization of the cable with the towing apparatus of this invention is directed toward extricating the motorcycle 10 from the depression below the vehicle 22.

Figure 2:
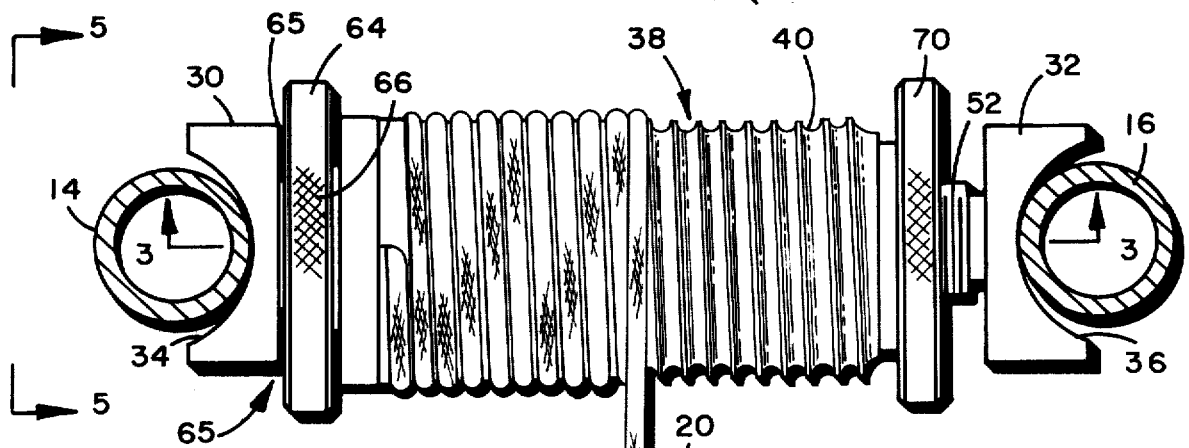
FIG. 2 shows a plan view of the towing apparatus implaced between the motorcycle fork in section along lines 2—2 of FIG. 1.
Figure 3:
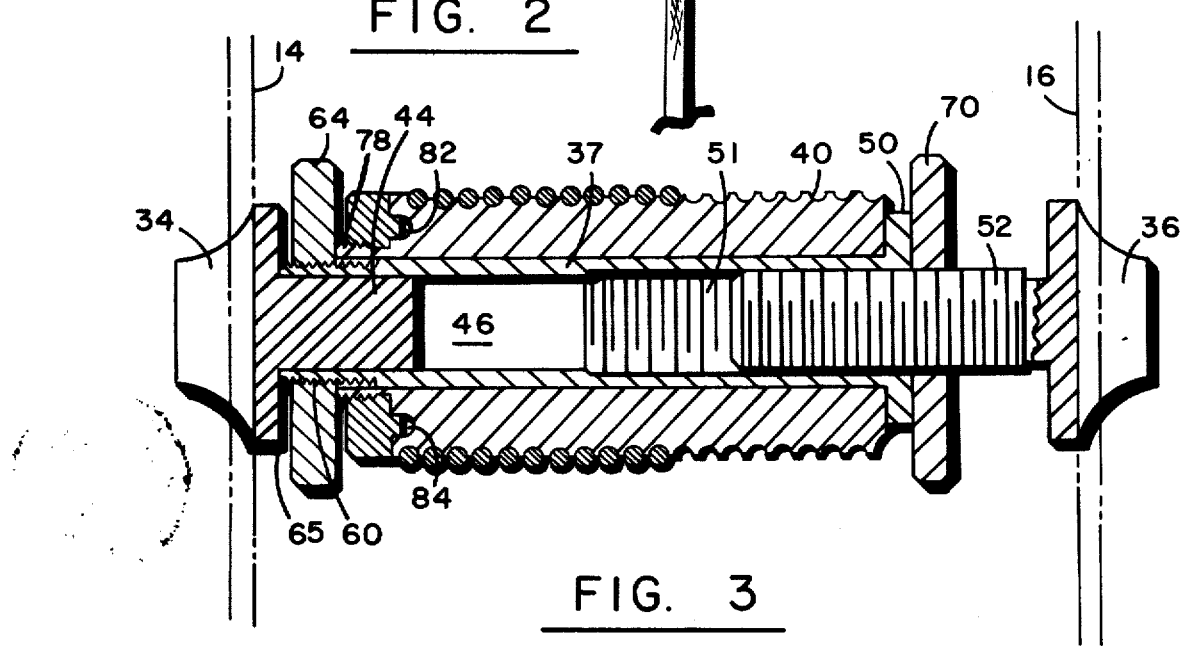
FIG. 3 shows a sectional view through the towing apparatus of FIG. 2 along lines 3—3 thereof.

Looking more specifically at the apparatus, FIG. 2 shows a plan view of the towing apparatus 18 of this invention as it is located between the tubular members 14 and 16.

The tubular members 14 and 16 are round. As a consequence, they must be accommodated by means of two mounting extensions 30 and 32, having respective concave sections 34 and 36. The concave sections 34 and 36 can be replaced by any suitable clamping means or frictional engagement means which will cause the extensions 30 and 32 to be seated thereagainst. In other words, it is not necessary to utilize a specific conformation, such as the concavities of the tubular members 34 and 36.

The extensions 30 and 32 respectively fit into a cylindrical insert or flanged sleeve 37 which journals a spool 38 which has been provided with flutes 40. The flutes 40 receive the cable 20 therein. The cable 20 is maintained from lateral movement by virtue of the fact that the flutes 40 are deep enough to prevent lateral movement of the cable 20 once it has been wrapped around the fluted spool 38. Each one of the extensions 30 and 32 fit into the bore 46 of the insert 37 to journal it. The extensions 30 and 32 also perform the function of securing the spool 38 between the tubular members 14 and 16 and providing its operation as will be described. The extension 30 is not threaded, but is provided with an insert 44 received within a longitudinal cylindrical bore 46 of the insert 37. The bore is a cylindrically smooth passage of the cylindrical flanged sleeve 37. The flanged sleeve 37 is provided with a disc-like end flange 50 which is seated against the spool 38.

The cylindrical insert 37 has right hand threads therein 51 which receive threads 52 from the end of extension 32, which are complementary to the right hand threads in the cylindrical insert. The cylindrical insert 37 is also threaded externally with left hand threads 60. The external left hand threads 60 receive a scored or checked collar 64 having knurling 66 thereon for hand rotation of the collar on the threads. It should be noted that a gap 65 exists between collar 64 and the insert 30. This gap allows the collar to back off from the spool 38 to release it in a manner to be described.

At the other end of the spool 38 is a second collar 70 having a knurled circumferential portion thereof. The collar 70 has a series of internal right hand threads 72 which mate with the threads 52. The collar 70, as will be described, provides a tightening effect on the spindle through its right hand threaded relationship. The knurled portion on collars 64 and 70 can be substituted with half round concave portions to provide alternate notches and protuberances for a better grip, or ribs on the circumference.

The spool 38 is also threaded with right hand threads 78 at the other end for receiving a stepped washer 80 having a step 82 which fits into a groove 84 of the spool 38. The groove 84 and the stepped washer 80 serve to clamp the cable 20 within the groove 84. The groove 84 completely circumscribes the spool so that the cable can be retained therein.

The cable is fitted within the circumferential groove 84 and bends around the spindle or spool in a manner whereby it is fed onto the flutes in a helical manner. In this mode, the cable 20 can be clamped and maintained by the stpe 82 of the washer 80 within the groove 84.

The spool 38 has a slot 90 shown in FIG. 7 which feeds out the cable 20 into the flutes 40. As can be seen, the cable 20 leads into the slot 90 in FIG. 2. The feed of the cable 20 in the direction of the threads of the stepped washer 80 allows for a tightening of the washer thereagainst. In other words, when the cable is pulled outwardly, it tends to cause the stepped washer 80 to push the step 82 in tighter relationship thereto.

The cable 20 extends outwardly from the slot 90 and is wrapped around the flutes 40 of the spool 38. The cable 20 is secured to an S shaped hook 94 which can be hooked to any bumper or fixture. The S shaped hook 94 is secured by means of an eyelet 96 which is attached to the cable frictionally by means of a swaged collar 98 crimped therearound. The cable 20 can be secured in any other suitable manner whereby the cable goes through an opening 100 of the collar and circumscribes the eyelet 96 to be received back into the opening of the fixture.

Regardless of the way in which the S shaped hook 94 is secured to the eyelet 96, there is preferably a means for attaching the cable to a vehicle for motive power. However, as can be understood, other suitable and various embodiments can be utilized to allow the cable to be attached to a vehicle.

It should also be understood that other configurations for attaching or clamping the device to a motorcycle fork are capable of utilization. For instance, various collars, extensions, spindles, and locking means for the cable can be substituted for the foregoing embodiments. In addition thereto, a different type of cylindrical insert 37 as well as different thread configurations can be utilized providing the spool 38 with a suitable securement, retraction, and extension means.

OPERATION OF THE INVENTION

As can be seen from the drawings, a small exposure of the threads 60 extends beyond the collar 64. Specifically, the threaded portion 60 on the cylindrical insert 37 can extend beyond the collar 64, so that the end 44 of the extension member 30 can freely rotate thereagainst and within the cylindrical insert 37.

Looking more particularly at the operation of the invention, it can be seen that the end collar 70 and extension 32 can be threaded outwardly in forceable frictional engagement with the fork members 14 and 16. In this manner, the spool 38 can be accommodated to any suitable position with respect to any particular fork size.

The invention is mounted by means of expanding the extension 32 outwardly toward the fork member 16 against which it is held. The extension is accomplished by virtue of the fact that the thread relationship between the extension 32 and the threads 51 internally of the cylinder 37 are right hand threads. Thus, the extension 32 can be extended outwardly, after which the collar 70 locks the extension 32 by being rotated backwardly against the flange 50 of the cylindrical member 37.

Thus, the spool 38 is mounted in the foregoing manner on a fork of a motorcycle by the threads' spreading action of the extension 32. The threaded spreader action of extension 32 can be accommodated by any other suitable means and as can be understood, is not to be limited to the foregoing configuration. However, as can be appreciated, the spool should be free to rotate when the cable is around the spool and is not locked by collar 64.

The threaded portion 60 of the cylindrical flanged insert 37 slips through the entire spool 38 so that it extends therethrough and engages the internal threads of the collar 64. In this manner, the collar 64 can be turned down on the threads of the cylindrical insert 37. Thus, the collar 64 serves as a lock when it is moved in a left hand manner and thereby checks the spool from rotation. By checking the spool 38 from rotation when it is up against the collar 64, it effectuates a storage of the cable 20 and prevents extension or paying it out.

When the collar 64 is backed off from the spool 38, it prevents the collar 64 from engaging the spool so that it no longer binds the spool and it is free to rotate.

Thus, during extraction of the cable 20 from the flutes 40 of the spool 38, the collar 64 is backed up against the extension 30. When the cable is fully extended, or it is desired to check it at some particular point, the collar 64 is then rotated threadedly against the spool 38 to prevent rotation thereof. It should be noted that the collar 64 engages the spool 38 at a limited area so as to avoid binding against the stepped washer 80. This is due to the extension of threads 78 beyond the interface of the washer 80.

After the cable 20 has served its purpose, the collar 64 is rotated in its left hand thread configuration to allow the spool 38 to wind the cable 20 backwardly thereon. After the cable 20 has been wound backwardly thereon, the hook is either attached to a particular member or placed at some portion so that the spool 38 can then be secured from further rotation by means of the collar 64 being threaded thereagainst.

The foregoing rotation of the collars 64 and 70 respectively checking the spool 38 and securing the entire apparatus 18 on the fork members 14 and 16 is substantially enhanced by the knurling 66 or concave notches thereon. This allows for a hand rotation of the device without any particular tools.

As an aside, the maintenance of the cable 20 within the circumferential groove 84 is enhanced by virtue of the fact that the cable feeds outwardly through the opening 90 and is secured in tightened relationship by the stepped washer 80. This maintains the cable within tightened position within the spool 38 without it coming loose. This is due to the fact that the threads on the washer 80 turn into their tightened position in the same direction as the cable is fed.

I claim:

1. A motorcycle towing apparatus comprising:
   a cylindrical spindle;
   a spool mounted for rotational movement on said cylindrical spindle;
   a collar member for movement along the axis of said spindle to cause said spindle to be held in expanded relationship against the motorcycle fork member;
   means for locking said spool against rotation; and,
   a cable attached to said spool for rolled retraction thereon.

2. The apparatus as claimed in claim 1 further comprising:
   two members extending from said spindle for mounting against the fork members of a motorcycle.

3. The apparatus as claimed in claim 2 wherein said extension members comprise:
   members having a cylindrical portion for placement axially within said cylindrical spindle; and,
   a concave portion for receiving a motorcycle fork.

4. The apparatus as claimed in claim 1 wherein:
   said spool is fluted.

5. The apparatus as claimed in claim 2 further comprising:
   a cylindrical portion on each of said extending members;
   a threaded collar for threaded receipt of the cylindrical portion of the first extension member for holding said extension member in locked threaded relationship with respect to said spindle; and,
   a second collar at the distal end therefrom having an oppositely threaded relationship to said first collar for threading it against the spool to prevent the rotation thereof.

6. The apparatus as claimed in claim 5 further comprising:
   a hook at one end of said cable for purposes of attachment of a vehicle to tow the motorcycle.

7. Means for providing a cable for towing a motorcycle comprising:
   a spool for receiving a cable therearound;
   a tubular spindle for rotationally mounting said spool;
   two extension members extending from said tubular spindle for extension against the fork members of a motorcycle for wedging said spindle therein; and,
   means for maintaining said extension members between the for members of said motorcycle.

8. The device as claimed in claim 7 wherein:
   at least one of said extension members is threaded for purposes of adjusting it inwardly and outwardly of said spindle for engagement against the fork of a motorcycle.

9. The device as claimed in claim 8 further comprising:
   a collar, and wherein;
   said extension member threadedly engages said collar which serves to secure the extension member against the spindle member for locking engagement thereof after the threaded member has been expanded.

10. The device as claimed in claim 9 further comprising:
    an extension member which seats freely within the spindle for rotational movement of said spindle and said tubular member thereon.

11. The device as claimed in claim 10 further comprising:
    a second collar oppositely threaded from said first collar for engaging said spool from rotation.

12. The device as claimed in claim 10 further comprising:
    a thread on said spool;
    a circumferential groove on the edge of said spool; and,
    a stepped threaded washer for securing the cable within said groove.

* * * * *